US012001835B2

(12) United States Patent
Rojas Fonseca et al.

(10) Patent No.: US 12,001,835 B2
(45) Date of Patent: Jun. 4, 2024

(54) IN-SERVICE SOFTWARE UPGRADE WITH ACTIVE SERVICE MONITORING

(71) Applicant: Hewlett Packard Enterprise Development LP, Houston, TX (US)

(72) Inventors: Francisco José Rojas Fonseca, Alajuela (CR); Jorge Arturo Sauma Vargas, San Jose (CR); Eduardo Francisco Ramirez Acosta, Heredia (CR); Pablo Cesar Barrantes Chaves, Heredia (CR)

(73) Assignee: Hewlett Packard Enterprise Development LP, Spring, TX (US)

( * ) Notice: Subject to any disclaimer, the term of this patent is extended or adjusted under 35 U.S.C. 154(b) by 241 days.

(21) Appl. No.: 17/551,136

(22) Filed: Dec. 14, 2021

(65) Prior Publication Data

US 2023/0185567 A1  Jun. 15, 2023

(51) Int. Cl.
*G06F 8/656*  (2018.01)

(52) U.S. Cl.
CPC .................................. *G06F 8/656* (2018.02)

(58) Field of Classification Search
None
See application file for complete search history.

(56) References Cited

U.S. PATENT DOCUMENTS

| | | | |
|---|---|---|---|
| 10,083,026 B1* | 9/2018 | Venkata | G06F 8/656 |
| 10,164,829 B1* | 12/2018 | Watson | H04L 49/252 |
| 10,545,778 B1* | 1/2020 | Venkata | G06F 9/45558 |
| 11,281,453 B1* | 3/2022 | Ramachandran | G06F 8/65 |
| 2015/0040115 A1* | 2/2015 | Capper | G06F 8/63 717/171 |
| 2018/0060061 A1* | 3/2018 | Savagaonkar | G06F 8/65 |
| 2019/0303129 A1* | 10/2019 | Nidumolu | H04L 45/563 |
| 2020/0153682 A1* | 5/2020 | Nidumolu | G06F 9/4416 |
| 2020/0310784 A1* | 10/2020 | Krishnan | H04L 45/563 |
| 2022/0014464 A1* | 1/2022 | Boutros | H04L 45/38 |
| 2022/0091870 A1* | 3/2022 | Khan | G06F 8/656 |

OTHER PUBLICATIONS

Saur et al., "Morpheus: Safe and Flexible Dynamic Updates for SDNs," Sep. 11, 2015, arXiv:1509.03614v1. (Year: 2015).*

* cited by examiner

*Primary Examiner* — Andrew M. Lyons
(74) *Attorney, Agent, or Firm* — Park, Vaughan, Fleming & Dowler LLP

(57) ABSTRACT

A system for performing in-service software upgrade on a network device is provided. In response to a software-upgrade command, the system generates an upgrade database based on a state database storing both a data-plane state and a control-plane state associated with the network device. The network device is managed by a management unit comprising a data-plane-management sub-unit and a control-plane sub-unit, and the upgrade database stores at least the data-plane state to allow the data-plane-management sub-unit to operate based on the upgrade database. The system separately upgrades the data-plane-management sub-unit and the control-plane sub-unit, without interrupting services provided by the network device. The system monitors the state database and the upgrade database to detect an event associated with the network device. In response to determining a triggering condition being met, the system performs an action to prevent a network outage or error.

18 Claims, 11 Drawing Sheets

IN-SERVICE SOFTWARE UPGRADE WITH ACTIVE SERVICE MONITORING

BACKGROUND

This disclosure is generally related to in-service software upgrade (ISSU) of network devices. More specifically, this disclosure is related to an ISSU process that actively monitors services provided by a network device while performing ISSU on the network device to prevent network outages that may be caused by the ISSU process.

BRIEF DESCRIPTION OF THE FIGURES

In the figures, like reference numerals refer to the same figure elements.

DETAILED DESCRIPTION

Figure 1:
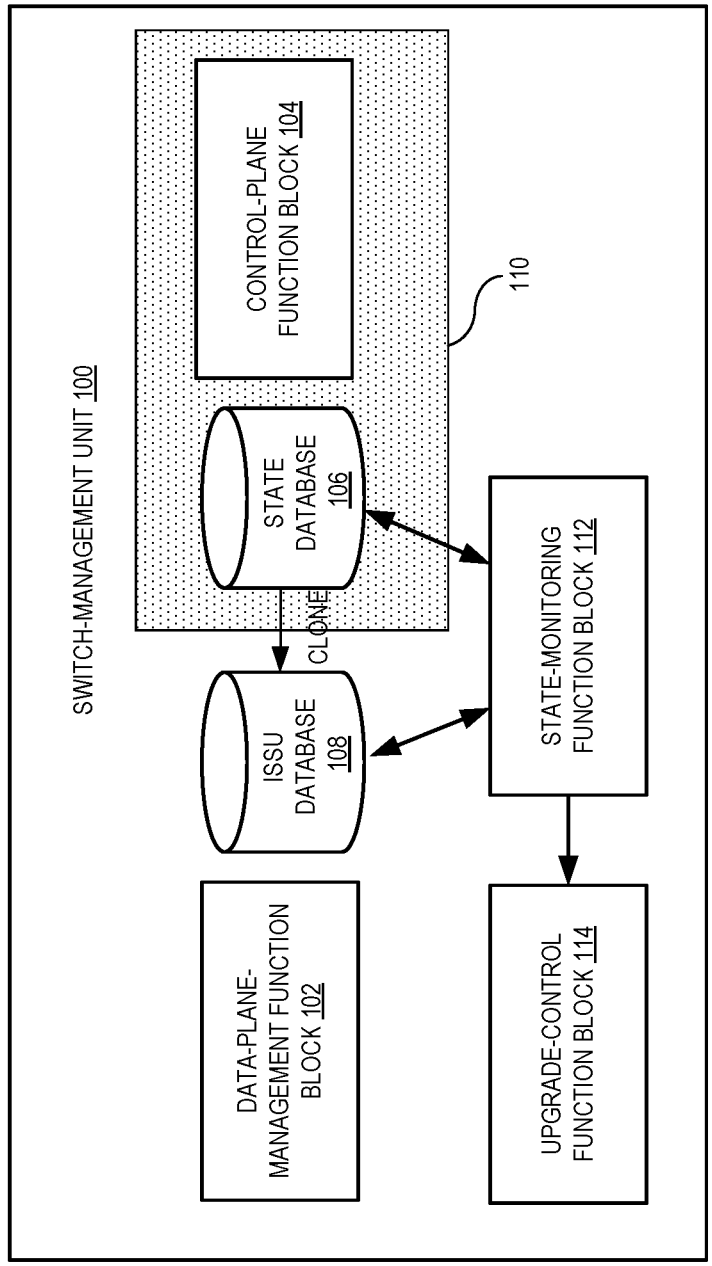
FIG. 1 presents a diagram illustrating the detachment between the data-plane-management function block and the control-plane function block of a switch-management unit, according to one aspect of the instant application.

The following description is presented to enable any person skilled in the art to make and use the examples and is provided in the context of a particular application and its requirements. Various modifications to the disclosed examples will be readily apparent to those skilled in the art, and the general principles defined herein may be applied to other examples and applications without departing from the spirit and scope of the present disclosure. Thus, the scope of the present disclosure is not limited to the examples shown but is to be accorded the widest scope consistent with the principles and features disclosed herein.

The disclosure provides a solution for in-service software upgrade (ISSU) that does not require any service shutdown and can be implemented in resource-constrained devices. To enable the ISSU for a network device, the control plane of the network device can be detached from the data-plane management of the network device to allow the network device to continue to service the network while its software is being upgraded. Detaching the control plane can involve generating an ISSU database based on a centralized state database of the network device such that the pre-upgrade data-plane configuration can be maintained. The ISSU process can be performed on the network device by separately upgrading the data-plane-management software and the control-plane software. When the data-plane-management software is being upgraded, the control-plane software remains in service. Upon completing the upgrade, the data-plane-management software can regain control of the data-plane hardware based on the pre-upgrade data-plane configuration. The control-plane software can be upgraded after the upgrade of the data-plane-management software. Upgrading the data-plane-management software and the control-plane software separately may cause inconsistency between the data-plane state and the control-plane state. Therefore, subsequent to upgrading the control-plane software, the control-plane state will be converged with the data-plane state to complete the entire ISSU process on the network device. The proposed ISSU solution can react to dynamic changes in the network during the upgrade process to preserve stability of the network. More specifically, the proposed ISSU system or process can actively monitor, based on a set of predefined criteria of critical services, a number of services while the upgrade is in process to detect external or internal events possibly affecting the network performance or the upgrade process itself. In response to detecting such events, the ISSU system can perform an appropriate action (e.g., aborting the software upgrade or rebooting the network device) to prevent network outages.

In-service software upgrade (ISSU) is a feature that allows users to perform upgrades on software (or firmware images) on a device/system without affecting services provided by the device/system or rebooting the network device/system. For the case of a network device (e.g., a switch or router), enabling ISSU means providing the capability of upgrading its software without interrupting traffic going through the network device (e.g., the switch or router continues to forward or route packets) or without disturbing the network (e.g., does not cause loops in the network).

Conventional ISSU approaches often require that, during software upgrade, the devices are placed in a state where they cannot react to changes generated by external events (e.g., link failures or network reconfigurations). This may lead to failure of the upgrade, or require the device to reboot, which can be time-consuming. When the device is being rebooted, it cannot provide normal services. In certain situations, certain external events occurring during the ISSU of a system may cause the system, or even the entire network, to be in an unstable state. Moreover, existing ISSU implementations in network devices require temporary shutting down of some or all of the control protocols, which limits their deployment to very simple network topologies or requires the user to take many preparatory steps before the ISSU operation.

It is possible to develop a workaround of the above limitations using virtualization or containerization on the devices. However, hardware requirements for such implementations are high, thus increasing the overall cost of the devices or making such approaches unsuitable for resource-constrained devices. This disclosure provides an ISSU solution that can overcome these limitations without increasing the hardware requirements. The proposed ISSU solution allows a user to upgrade the software of network devices without having to shut down any service or network control protocol, and this solution can be implemented in resource-constrained devices (e.g., edge switches). Moreover, the proposed solution allows the user to define a set of criteria of critical services that can be monitored during the upgrade process to detect external or internal events that may require remedial actions (e.g., pausing or interrupting the upgrade, or rebooting the network device) to avoid instability of the network that can lead to network outages. Because the proposed ISSU solution monitors and reacts to dynamic changes in the network during device upgrade, it can also be referred to as dynamic ISSU.

To implement the dynamic ISSU on a network device (e.g., a switch), one may divide the software controlling the device (e.g., the switch operating system) into multiple (e.g., two) function blocks that can be detached from each other. For example, the switch operating system can be split into a data-plane-management function block and a control-plane function block. The data-plane-management function block controls all processes for configuring the hardware, such as the packet-forwarding application-specific integrated circuit (ASIC). The control-plane function block can control processes for receiving and sending packets (e.g., control packets) to the network or managing user-visible services. Note that both the data-plane-management function block and the control-plane function block of the switch operating system can be part of the control plane of the switch. The detachment between the control-plane function block and the data-plane-management function block can allow these two function blocks to be upgraded separately. For example, while the data-plane-management function block is being upgraded (which can involve shutting it down and then restarting it at a higher version), the detached control-plane function block continues to run to facilitate continued monitoring of the network and the internal device state in order to react to dynamic changes in the network.

Moreover, to enable the dynamic ISSU, the control-plane state of the to-be-upgraded device should also be detached from the data-plane state of the device. The control-plane state of a switch is the state shared by the management software of the switch with the network at large and can include networking protocols, e.g., Spanning Tree Protocol (STP), Open Shortest Path First (OSPF) protocol, Border Gateway Protocol (BGP), etc. The data-plane state of the switch describes how the switch is configured. According to one aspect, before upgrading, a copy of the data-plane state of the device can be generated to keep a stable snapshot of the pre-upgrade data-plane configuration. This way, when the date-plane-management software is upgraded and regains control of the hardware, configurations of the hardware can be based on the data-plane state of the device before the upgrade. The control-plane function block can be upgraded after the upgrade of the data-plane-management function block. Although the data-plane state is not updated dynamically during the upgrade, the control-plane state is updated dynamically by the control-plane software based on network events. The control-plane state and the data-plane state can be converged after the ISSU process.

FIG. 1 presents a diagram illustrating the detachment between the data-plane-management function block and the control-plane function block of a switch-management unit, according to one aspect of the instant application. Note that the complete detachment between the data-plane-management function block and the control-plane function block can occur at the start of the ISSU process. FIG. 1 shows a switch-management unit 100, which can include various software and hardware components that manage and control the operations of the switch, such as implementing protocols and forwarding packets.

In FIG. 1, switch-management unit 100 can include a data-plane-management function block 102, a control-plane function block 104, and a state database 106. Data-plane-management function block 102 can include components (not shown in FIG. 1) used for configuring the switch hardware (e.g., packet-forwarding ASIC). Control-plane function block 104 can include components (not shown in FIG. 1) used for receiving and sending packets (e.g., control packets) to the network or managing user-visible services. State database 106 can include state information associated with the control plane and the data plane. The data-plane state of the switch describes how the data-plane hardware is configured. The control-plane state of the switch is the state that the management software of the switch shares with the network at large and can include networking protocols, e.g., Spanning Tree Protocol (STP), Open Shortest Path First (OSPF) protocol, Border Gateway Protocol (BGP), etc.

Moreover, switch-management unit 100 can include a temporary database, referred to as ISSU database (or simply an upgrade database) 108. According to one aspect, ISSU database 108 is generated in response to an upgrade command (e.g., an ISSU command). For example, in response to receiving an upgrade command, switch-management unit 100 can generate ISSU database 108 by copying entire state database 106. In this example, ISSU database 108 is a clone of state database 106 and contains both the data-plane state and the control-plane state of the switch at the time of cloning. According to one aspect, copying all contents of state database 106 to ISSU database 108 can be done using a smart "copy-on-write" mechanism that only duplicates what becomes different, thereby reducing the memory requirements for cloning state database 106. This can be implemented using functionalities available in Linux kernel. In a separate example, in response to receiving an upgrade command, switch-management unit 100 can generate ISSU database 108 by copying only the data-plane state information included in state database 106. This way, ISSU database 108 only contains the data-plane state of the switch at the current time instant.

The generation of a temporary database (e.g., ISSU database 108) to maintain a copy of the pre-upgrade data-plane state enables the detachment between data-plane-management function block 102 and control-plane function block 104. In fact, control-plane function block 104 and state database 106 can form a detached control plane 110 that continues to operate normally (e.g., sending and receiving control packets) when data-plane-management function block 102 is being upgraded, without shutting down any control protocol. On the other hand, the upgrade of data-plane-management function block 102 can be performed based on the data-plane state stored in ISSU database 108. Note that, during upgrade, the detached control plane does not affect the pre-upgrade data-plane state stored in ISSU database 108 such that the data-plane state corresponds to the state of a stable network before the upgrade.

Switch-management unit 100 can include a state-monitoring function block 112 for monitoring the data-plane state and the control-plane state included in both databases (i.e., state database 106 and ISSU database 108) in order to monitor services provided by the switch (e.g., monitoring network events as well as events on the switch). State-monitoring function block 112 can be activated by the upgrade command, which may come from the user or a process. Errors on the switch (e.g., hardware failure) or in the network (e.g., link failure) or network events that may affect the upgrade (e.g., a network reconfiguration) can also be monitored by monitoring changes in the state.

To reduce the amount of resources needed to perform the monitoring, state-monitoring function block 112 does not need to monitor all services or all aspects of the network. According to one aspect, state-monitoring function block 112 can be configured to monitor services selected based on a set of pre-defined criteria. The service-selection criteria can be defined by the user or generated automatically by the upgrade process. For example, state-monitoring function block 112 can be configured to monitor services that are deemed critical (e.g., services critical to the application or services affecting the stability of the network). A service or group of services can be defined as critical based on their type and the application need. For example, for financial applications, services associated with user authentication can be considered critical.

In addition to their type, services may also be defined as critical based on other criteria, such as ports, interfaces, overlays (or tunnels), and AAA (Authentication, Authorization, and Accounting) events, that are associated with the services. During the upgrade process, state-monitoring function block 112 can be configured to monitor events that may affect these services such that, when needed, the upgrade process can be aborted to minimize the overall impact beyond the device being upgraded. Examples of critical services can include control-plane protocols, control-plane packet management, data-plane services, and physical ports. For example, a port or a set of ports on a switch can be defined as critical (e.g., for being connected to core switches). Accordingly, state-monitoring function block 112 can be configured to monitor the state of these ports during the upgrade process. If state-monitoring function block 112 detects an event (e.g., a link event or a port failure) associated with the port that requires an action from the switch to avoid a network-wide outage, the switch can perform the action. In one example, the switch can abort or roll back the upgrade process to reset the switch to a previous state where it can take the required action.

Moreover, certain protocols can also be defined as critical such that state-monitoring function block 112 can be configured to monitor network events relevant to the critical protocols. For example, the user may define STP as critical. Consequently, state-monitoring function block 112 can be configured to monitor network reconvergence events, which may lead to loops in the network. Other than events occurring in the network or on the switch hardware, state-monitoring function block 112 can also be configured to monitor internal failures (e.g., process crashes) of switch-management unit 100 that may affect the network and cannot be recovered during the upgrade process.

Switch-management unit 100 can further include an upgrade-control function block 114 for controlling the upgrade process. More specifically, upgrade-control function block 114 can be configured to receive event notifications from state-monitoring function block 112 and perform an action in response to one or more events meeting a triggering condition. According to one aspect, actions performed by upgrade-control function block 114 can include but are not limited to: pausing the upgrade process, rolling back the upgrade process to a previous state, aborting the upgrade process, rebooting the device being upgraded, etc. Examples of the triggering condition can include but are not limited to: possibility of causing the upgrade to fail, possibility of causing instability in the network, possibility of causing failure or interruption of critical services, etc. For example, during the upgrade process, state-monitoring function block 112 may detect failure of a port connected to a core switch, and upgrade-control function block 114 may determine that ignoring such a failure during the upgrade may result in an unstable network. In response, upgrade-control function block 114 may take an action to abort the upgrade process to allow the switch to take remedial actions, such as redirecting traffic to a backup port. Once the problem is solved, upgrade-control function block 114 can restart the upgrade process. In another example, during the upgrade process, state-monitoring function block 112 detects a reconvergence event in the network, which may lead to traffic loops. In response, upgrade-control function block 114 may abort the upgrade process to allow the switch to react to the network reconvergence event to prevent network-wide traffic loops.

Figure 2A:
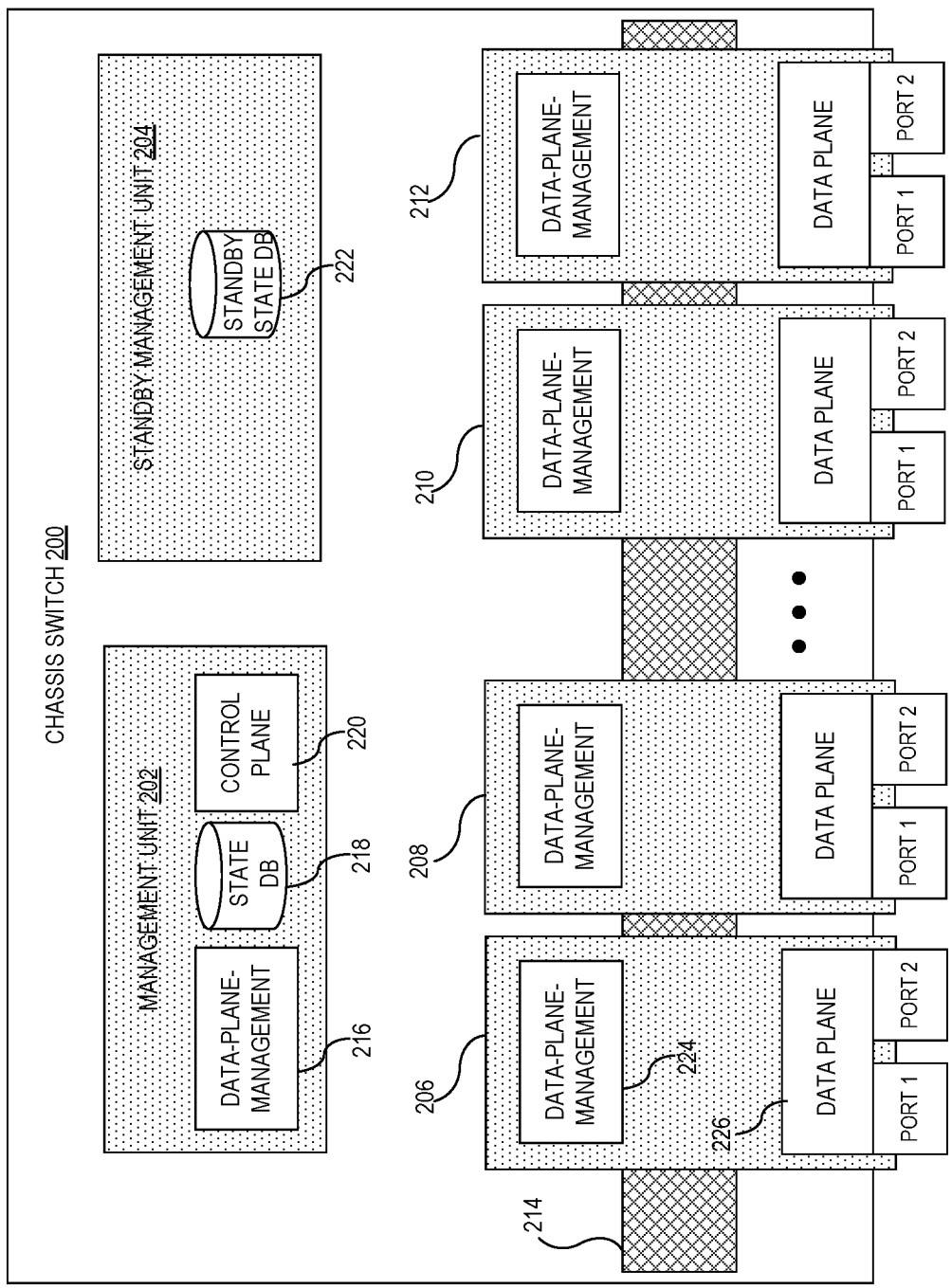
FIG. 2A illustrates a distributed chassis switch with in-service software upgrade (ISSU) capabilities, according to one aspect of the application.

Switch-management unit 100 can be used to manage switches of different types, including both chassis switches and stacked switches. FIG. 2A illustrates a distributed chassis switch with in-service software upgrade (ISSU) capabilities, according to one aspect of the application. In FIG. 2A, chassis switch 200 includes a management unit 202, a standby management unit 204, and a number of line cards (e.g., line cards 206-212) attached to a backplane 214.

According to one embodiment, management unit 202 and standby management unit 204 can each include processing resources (e.g., processors and memories) and various interfaces (not shown in FIG. 2A) that can facilitate the management and control of chassis switch 200. Moreover, management unit 202 can include a data-plane-management sub-unit 216, a state database 218, and a control-plane sub-unit 220. State database 218 stores information associated with the data-plane state and the control-plane state of chassis switch 200. Standby management unit 204 provides redundancy and is normally placed in a standby mode with its own data-management sub-unit and control-plane sub-unit not activated (hence not shown in FIG. 2A). Standby management unit 204 can include a standby state database 222, which can be synchronized with state database 218.

In the example shown in FIG. 2A, chassis switch 200 has a distributed architecture, meaning that each line card has its own built-in processing resources (e.g., processors and memories) to manage data-plane hardware on the line card. For example, line card 206 can include a data-plane-management sub-unit 224 that can receive management packets from data-plane-management sub-unit 216 in management unit 202 to manage/control data-plane hardware 226 on line card 206. FIG. 2A also shows that each line card can include multiple ports (e.g., port 1 and port 2) for interfacing with the network at large (e.g., sending and receiving packets to and from the network).

Figure 2B:
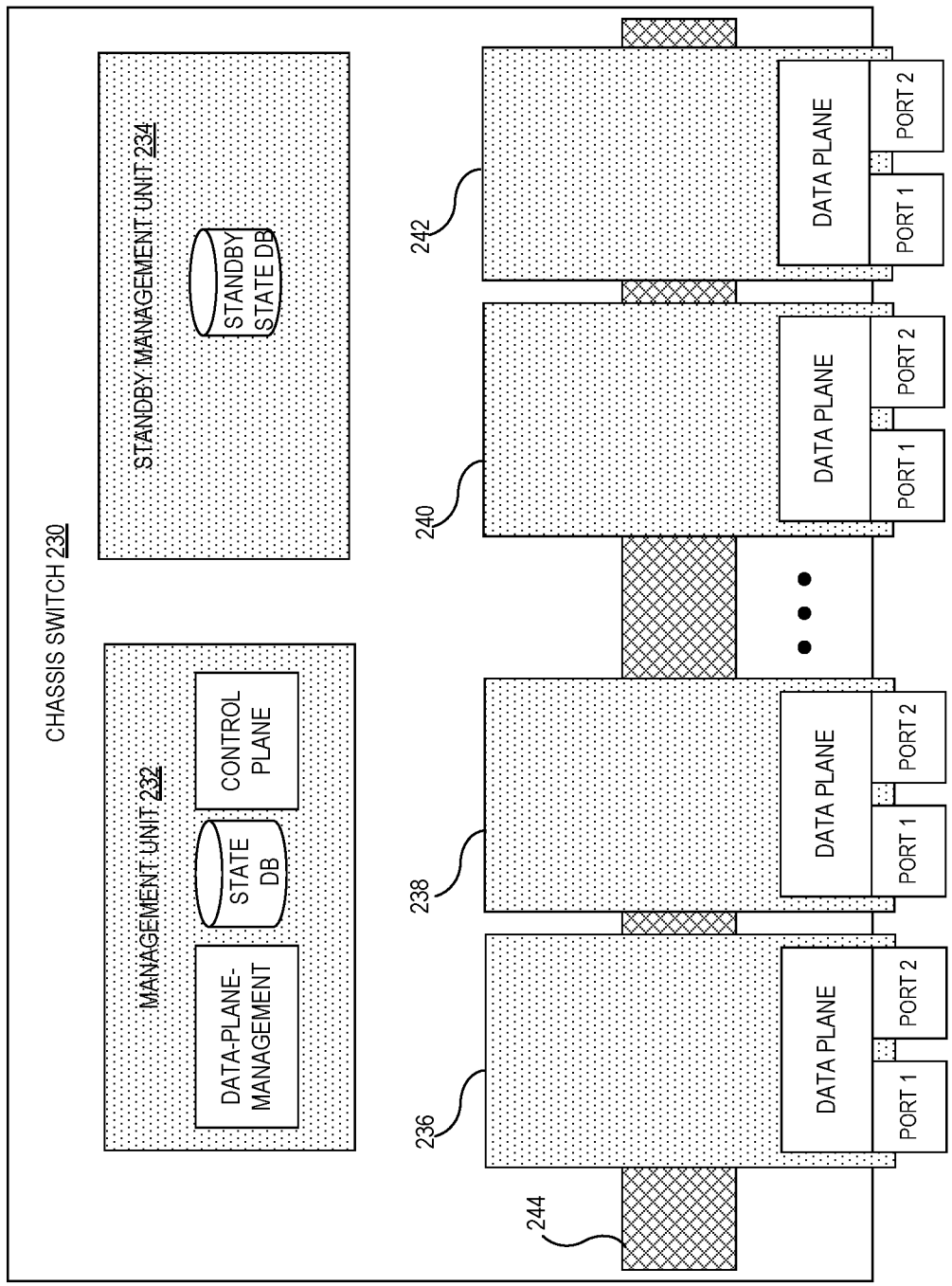
FIG. 2B illustrates a centralized chassis switch with in-service software upgrade (ISSU) capabilities, according to one aspect of the application.

FIG. 2B illustrates a centralized chassis switch with in-service software upgrade (ISSU) capabilities, according to one aspect of the application. In FIG. 2B, chassis switch 230 can include a management unit 232, a standby management unit 234, and a number of line cards (e.g., line cards 236-242) attached to a backplane 244. Management unit 232 and standby management unit 234 can be similar, respectively, to management unit 202 and standby management unit 204 shown in FIG. 2A. However, unlike the distributed architecture shown in FIG. 2A, chassis switch 230 has a centralized architecture, meaning that all processing is done by centralized management unit 232 and the line cards do not have processing capability. As shown in FIG. 2B, there is no data-plane-management sub-unit on each line card to control the data-plane components; instead, the management and control of the data-plane components are performed by data-plane-management unit 232.

Figure 2C:
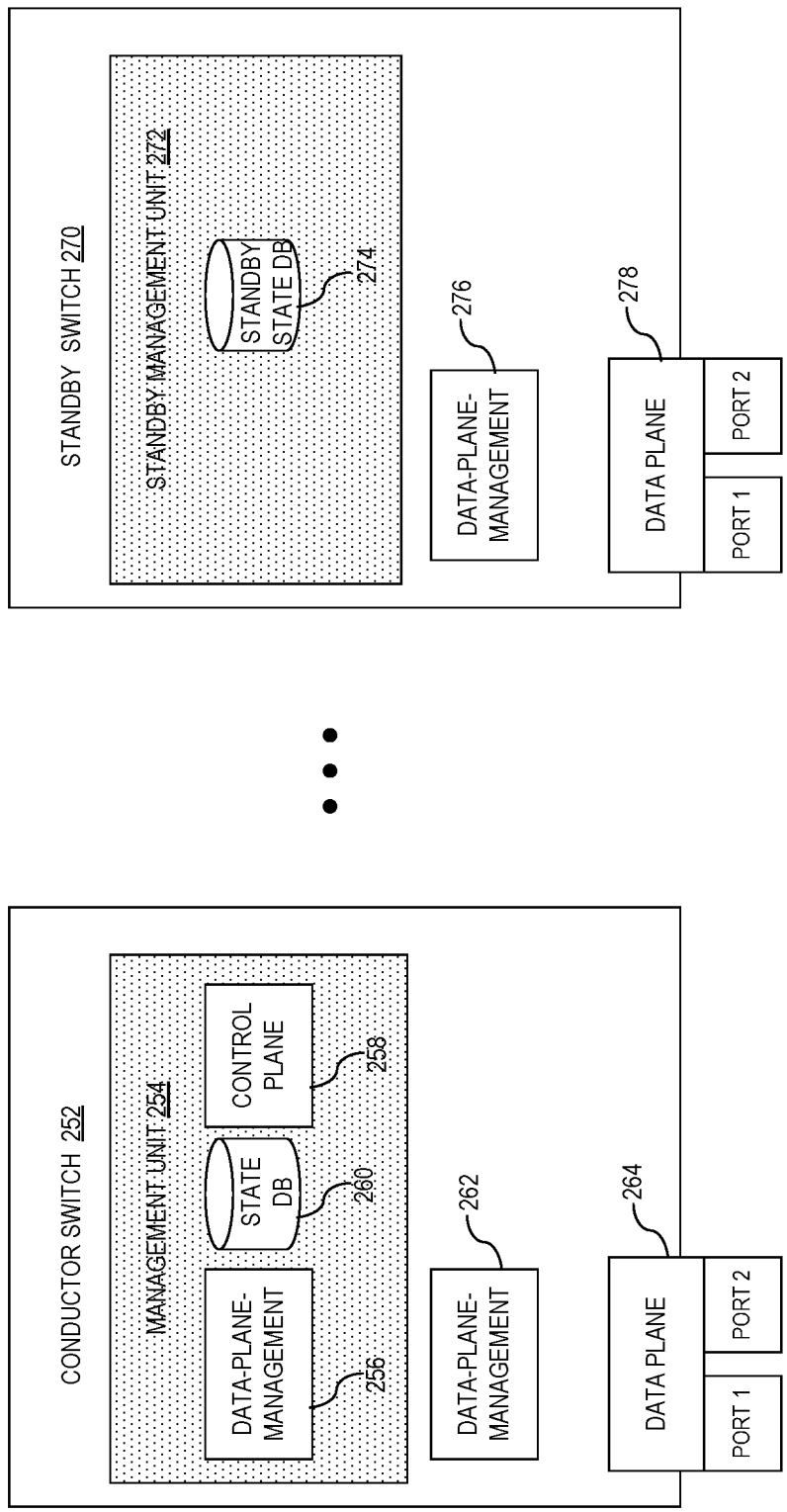
FIG. 2C illustrates a stacked switch system with in-service software upgrade (ISSU) capabilities, according to one aspect of the application.

FIG. 2C illustrates a stacked switch system with in-service software upgrade (ISSU) capabilities, according to one aspect of the application. Stacked switch system 250 can include a plurality of stacked switches, including a conductor switch 252 and a standby switch 270. Conductor switch 252 can include a management unit 254 and standby switch 270 can include a standby management unit 272. Management unit 254 and standby management unit 272 can be similar, respectively, to management unit 202 and standby management unit 204 shown in FIG. 2A. For example, management unit 254 can include a data-plane-management sub-unit 256, a control-plane sub-unit 258, and a state database 260; standby management unit 272 can include a standby database 274. In addition, each switch can include its own data-plane-management sub-unit that can receive management packets from data-plane-management sub-unit 256 of management unit 254 to manage/control data-plane hardware on the switch. For example, conductor switch 252 can include a data-plane-management sub-unit 262 that manages data-plane hardware 264, and standby switch 270 can include a data-plane-management sub-unit 276 that manages data-plane hardware 278.

Note that FIGS. 2A-2C only illustrate activated components within the switches before the switches perform the in-service upgrade. Hence, the ISSU database is not shown in the management unit in each switch because it is generated at the beginning of the upgrade process responsive to an upgrade command.

As shown in FIGS. 2A-2C, the dynamic ISSU solution can be implemented in different types of switches by separating the data-plane-management functions and the control-plane functions. As discussed previously, the data-plane-management functions can be responsible for configuring the switch hardware (e.g., packet-forwarding ASICs). Using the distributed chassis switch as an example, the data-plane-management function executed by a line card processor can receive management packets from the data-plane-management function executed by the chassis processor to configure hardware on the line card. On the other hand, the control-plane function executed by the chassis processor can send or receive network packets via data-plane hardware. Note that the packet forwarding from the data-plane hardware to the control-plane function block is independent of the data-plane-management function block that manages the data plane itself.

Figure 3:
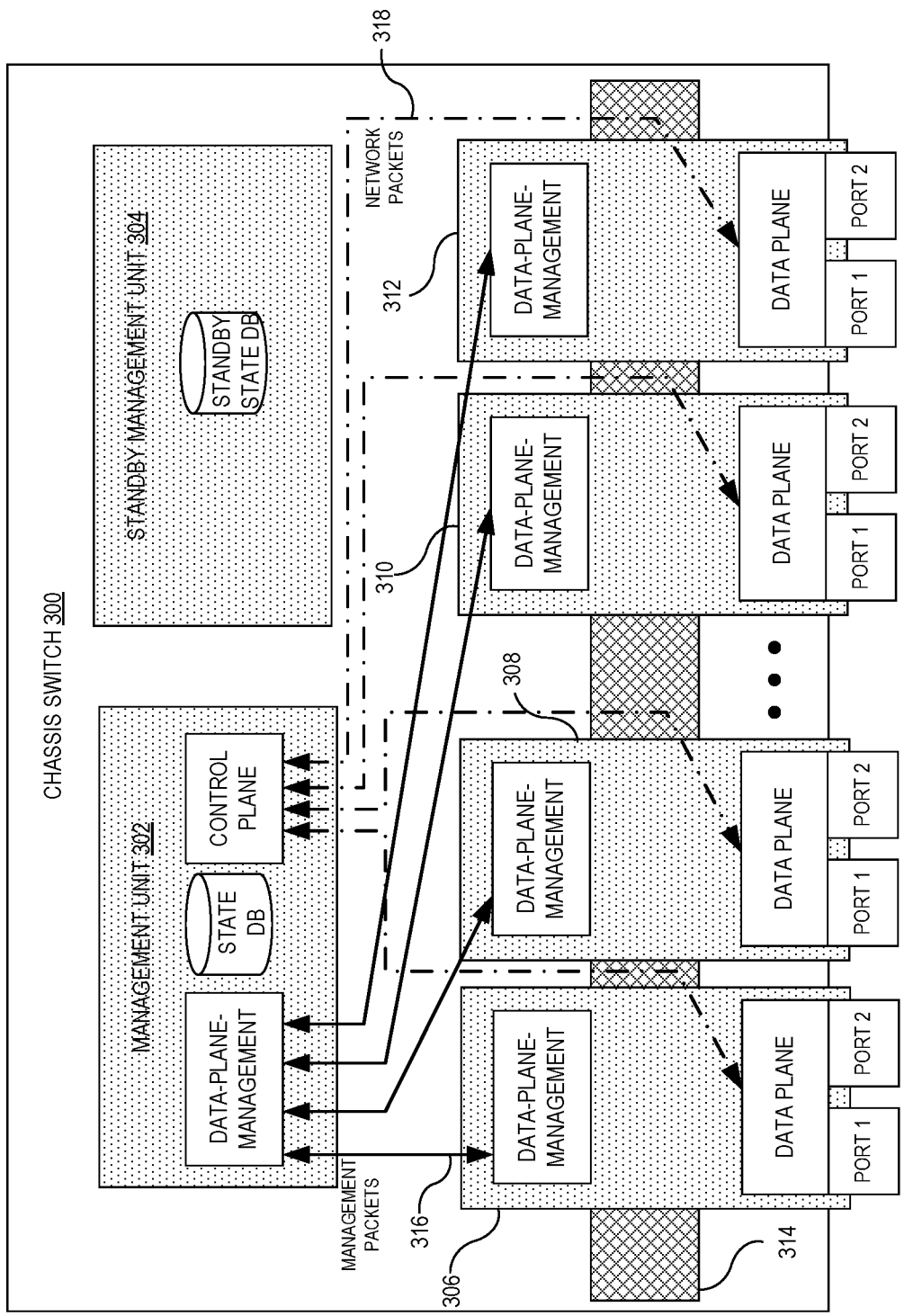
FIG. 3 illustrates the data-plane-management path and the control-plane path in a chassis switch, according to one aspect of the instant application.

FIG. 3 illustrates the data-plane-management path and the control-plane path in a chassis switch, according to one aspect of the instant application. In FIG. 3, chassis switch 300 can be similar to chassis switch 200 shown in FIG. 2A and can include a management unit 302, a standby management unit 304, and a number of line cards (e.g., line cards 306-312) attached to a backplane 314. FIG. 3 shows the data-plane-management paths (e.g., a path 316 between the data-plane-management sub-unit in management unit 302 and the data-plane-management sub-unit in line card 306). For example, the data-plane-management sub-unit in management unit 302 can send/receive management packets to/from the data-plane-management sub-unit in line card 306 via path 316 to facilitate the data-plane-management sub-unit in managing/configuring the data-plane hardware in line card 306. In FIG. 3, the data-plane-management paths are marked using solid double arrows.

In addition to data-plane-management paths, FIG. 3 also shows the control-plane paths (e.g., a path 318 between the control-plane sub-unit in management unit 302 and the data-plane hardware in line card 312). For example, the control-plane sub-unit in management unit 302 can send/receive network packets (e.g., control packets) to/from the data-plane hardware in line card 312 via path 318. The data-plane hardware can transmit packets to and receive packets from the external network. In FIG. 3, the control-plane paths are marked using dashed double arrows.

Both the data-plane-management path and the control-plane path for a line card can be implemented using the same hardware, such as a Peripheral Component Interconnect Express (PCIe) bus coupling the chassis processor and the line card. For example, data-plane-management path 316 can be a PCIe bus connecting management unit 302 and line card 306, and control-plane path 318 can be a PCIe bus connecting management unit 302 and line card 312. However, it is also possible to use separate hardware paths to implement the data-plane-management path and the control-plane path. Because the communication between the data-plane management and the control plane is independent of the implemented hardware, the dynamic ISSU solution can be flexible enough to be implemented in different types of switches, including but not limited to: chassis switches with distributed processing, chassis switches with centralized processing, and stacked switches.

Figure 4:
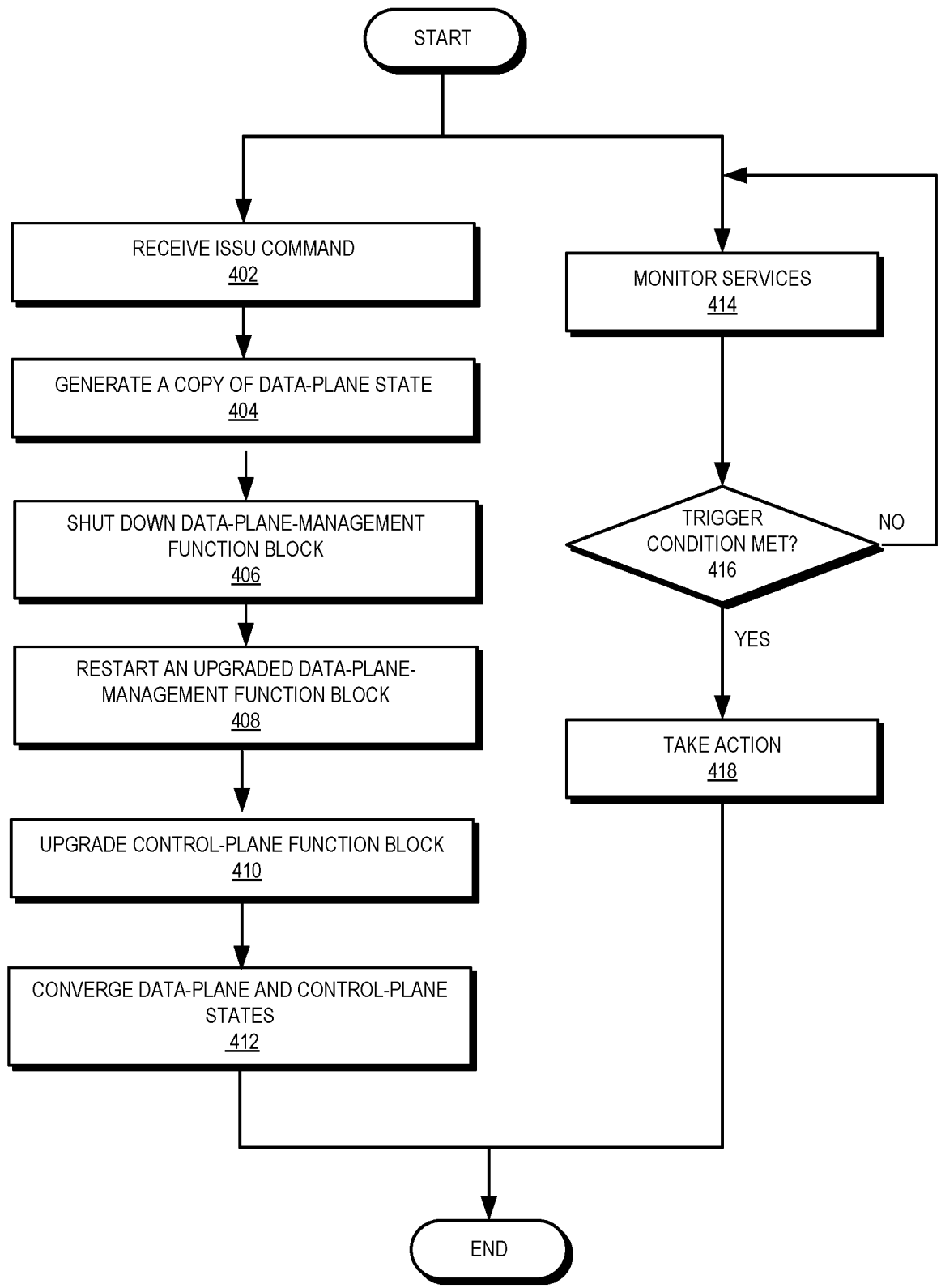
FIG. 4 presents a flowchart illustrating a dynamic in-service software upgrade process, according to one aspect of the instant application.

FIG. 4 presents a flowchart illustrating a dynamic in-service software upgrade (ISSU) process, according to one aspect of the instant application. During operation, the to-be-upgraded network device receives a command to start the ISSU process (operation 402). The command may be received from a user (e.g., via a command line interface (CLI)) or from a process. The network device can be a switch, a router, a Wi-Fi access point, an Internet of Things (IoT) device, etc. Because this dynamic ISSU solution does not require virtualization or containerization, the hardware requirements for the to-be-upgraded device can be low, making the dynamic ISSU solution suitable for small-scale, low-cost devices. To enable the dynamic ISSU, the management unit (e.g., the processor) of the to-be-upgraded device should have a data-plane-management function block, a separate control-plane function block, and a centralized state database, similar to what is shown in FIGS. 2A-2C. The centralized database stores the data-plane state as well as the control-plane state. Note that during normal operation, the data-plane state may be updated by the data-plane-management function block to reflect changes in the data-plane hardware and the control-plane function block to reflect changes in the network. The control-plane function block may also update the control-plane state based on changes in the network.

In response to receiving the ISSU command, the device generates a copy of at least the state information associated with the data plane (operation 404). According to one aspect of the instant application, a clone of the state database can be generated. The cloned database (also referred to as an ISSU database) can include both the data-plane state as well as the control-plane state of the to-be-upgraded device. According to another aspect, the ISSU database can be generated by copying only the data-plane state such that it only includes a copy of the data-plane state to reduce the memory usage. Various mechanisms can be used to generate the ISSU database. For example, a smart "copy-on-write" mechanism can be used to reduce the memory requirements for copying. The generation of the ISSU database enables the detachment between the control-plane state and the data-plane state, where the control-plane state remains in the state database and the data-plane state at the beginning of the upgrade is kept in the ISSU database. Note that, once the ISSU database is generated, the data-plane-management function block can operate based on the ISSU database, whereas the control-plane function block operates separately based on the state database. During the ISSU process, the control-plane function block updates the control-plane state based on dynamic changes in the network without affecting the data-plane state in the ISSU database.

Figure 5A:
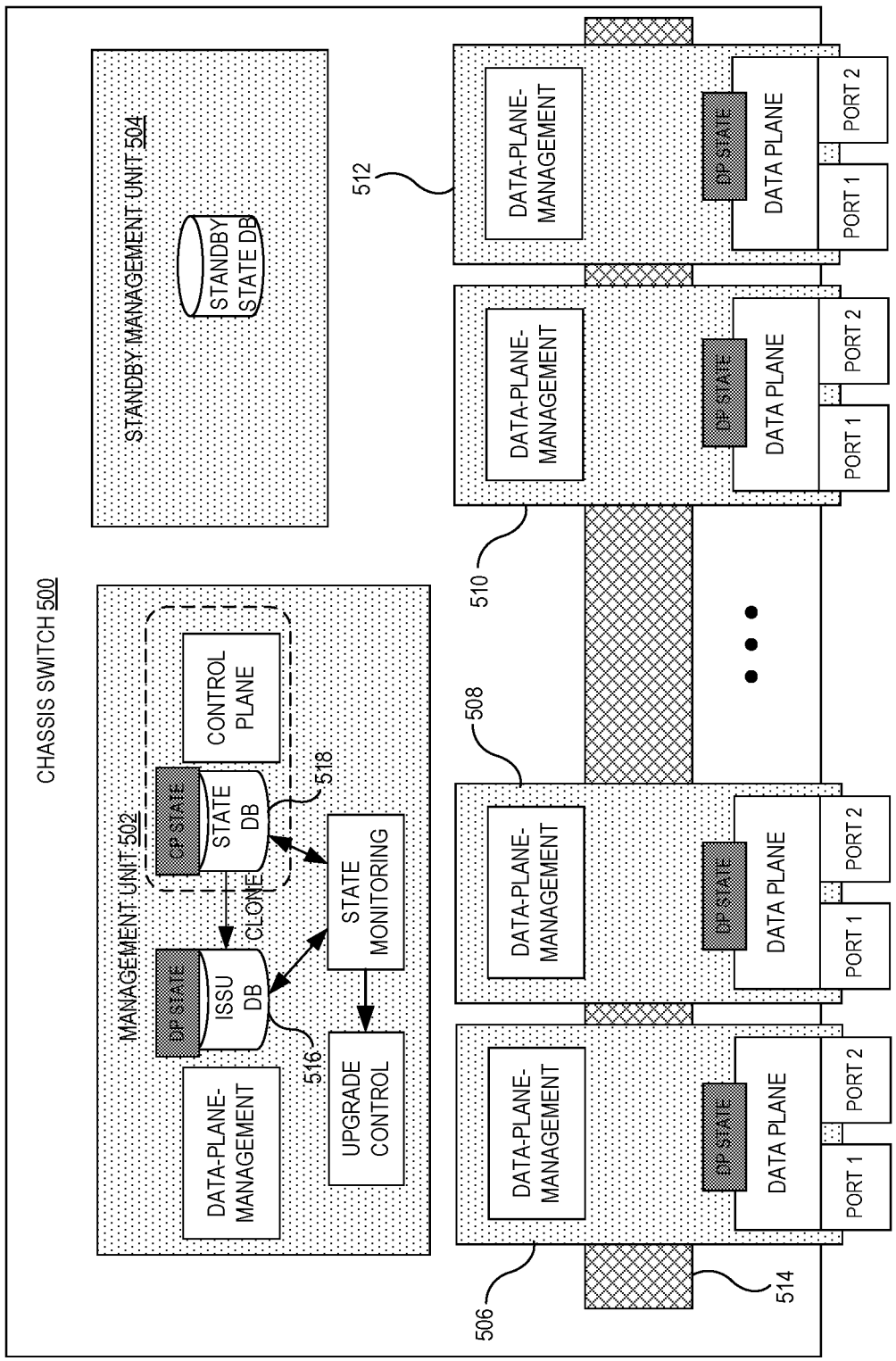
FIG. 5A illustrates the detachment between the control-plane state and the data-plane state, according to one aspect of the instant application.

FIG. 5A illustrates the detachment between the control-plane state and the data-plane state, according to one aspect of the instant application. Using a chassis switch as an example, FIG. 5A shows that a chassis switch 500 can include a management unit 502, a standby management unit 504, and a number of line cards (e.g., line cards 506-512) attached to a backplane 514.

FIG. 5A also shows that an ISSU database 516 is generated by cloning state database 518, such that the data-plane state used by the data-plane-management function block is stored in ISSU database 516, whereas the control-plane state is stored in state database 518. The control-plane function block within management unit 502 can now operate independently of the data-plane-management function block.

Returning to FIG. 4, subsequent to generating the copy of the data-plane state, the device can upgrade the data-plane-management function block, which can include first shutting down or terminating the data-plane-management function block (operation 406) and then restarting an upgraded version of the data-plane-management function block (operation 408). Note that the upgraded version of the data-plane-management function block has been downloaded previously (e.g., stored in a memory). While the data-plane-management function block is being upgraded, the control-plane function block continues to operate normally and the synchronization between the control-plane state and the state of the network is kept stable.

Figure 5B:
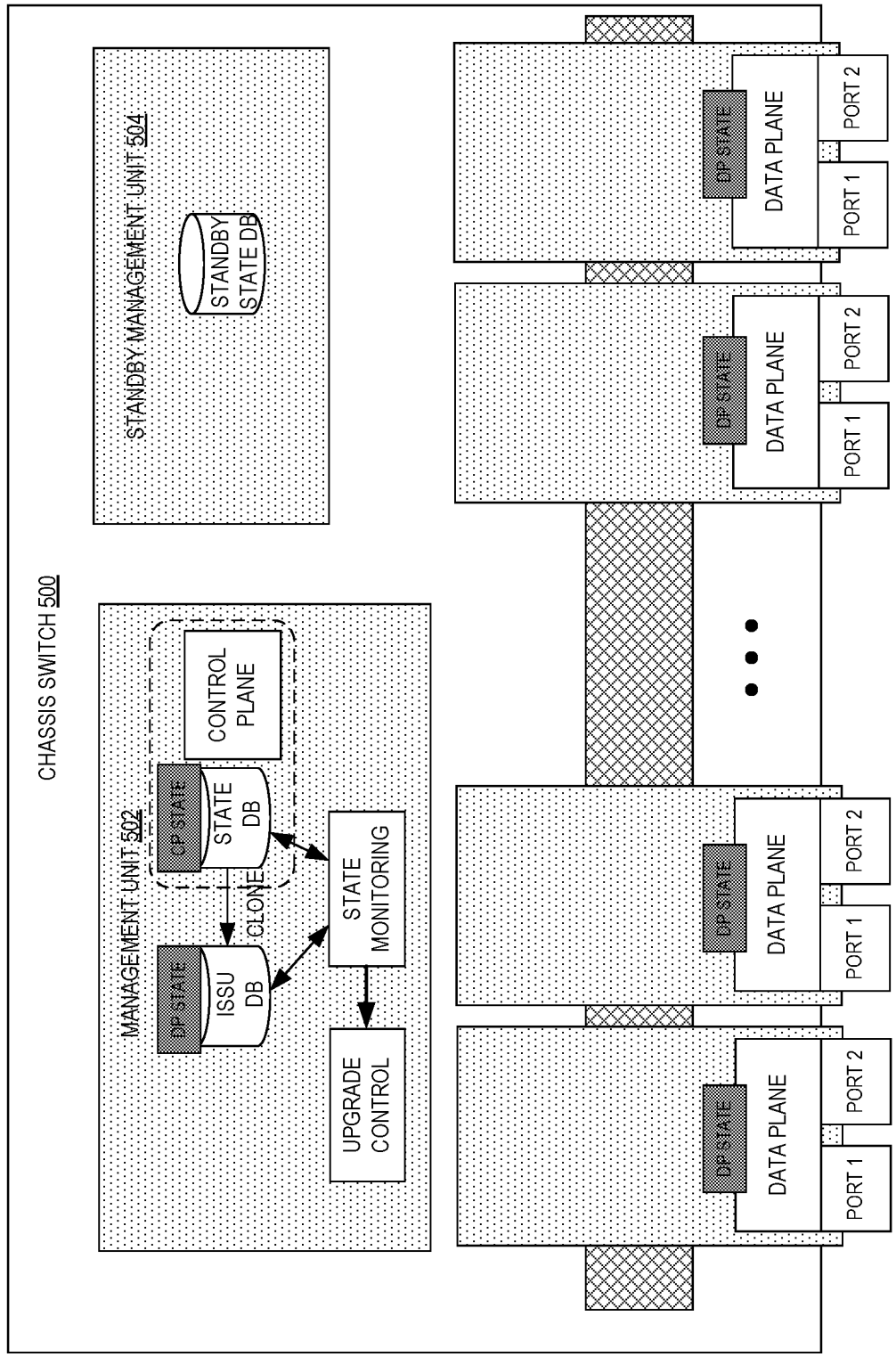
FIG. 5B illustrates the chassis switch operating without the data-plane-management function block, according to one aspect of the instant application.

When the data-plane-management function block is turned off during the upgrade process, the data plane of the device operates in an autonomous mode. In other words, the device operates without its hardware-management software running. FIG. 5B illustrates the chassis switch operating without the data-plane-management function block, according to one aspect of the instant application.

Figure 5C:
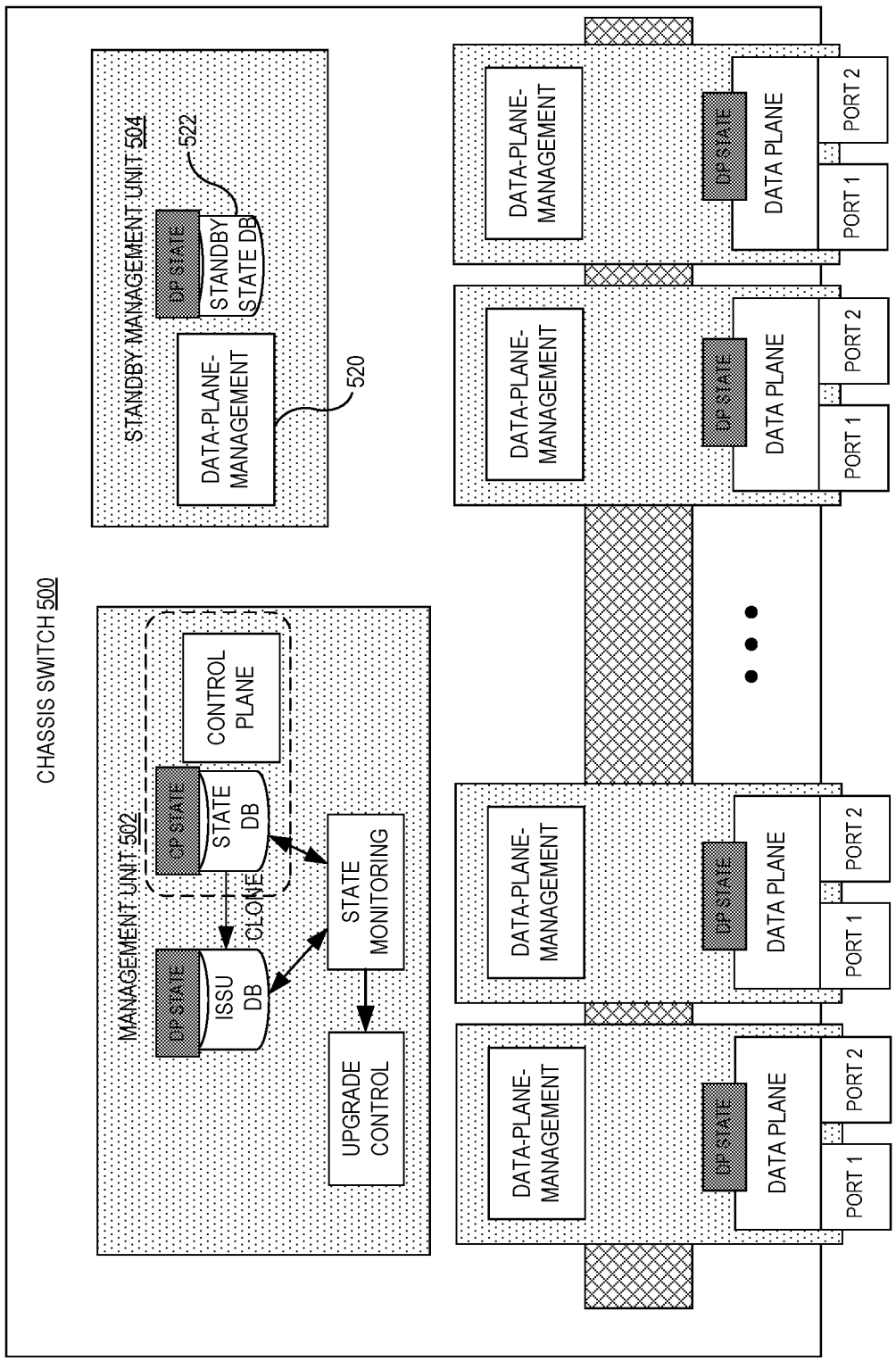
FIG. 5C illustrates the chassis switch with the upgraded data-plane-management function block, according to one aspect of the instant application.

To reduce the hardware requirements (e.g., memory and processing power) for performing the dynamic ISSU, according to one aspect, when the upgraded data-plane-management function block is restarted, it can migrate to the standby management unit (e.g., a standby processor) and content of the ISSU database is synchronized to the standby state database. This allows the upgraded data-plane-management function block to take control of the data-plane hardware using the data-plane state in the standby state database. FIG. 5C illustrates the chassis switch with the upgraded data-plane-management function block, according to one aspect of the instant application. In FIG. 5C, upgraded data-plane-management function block 520 migrates to standby management unit 504 and the data-plane state stored in standby state database 522 is synchronized with the data-plane state stored in the ISSU database. After the synchronization, the ISSU database may be deleted. When data-plane-management function block 520 reattaches to data-plane hardware on the line cards, it uses the data-plane state stored in standby state database 522 to configure the hardware. Note that the data-plane state in the ISSU database has not been updated by the control pane during the ISSU process. It is assumed that the network is stable before the ISSU process. Hence, the pre-upgrade data-plane state reflects the state of the device in a stable network. Starting the upgraded data-plane-management function block 520 using the pre-upgrade data-plane state is less likely to cause errors in the device or in the network.

Figure 5D:
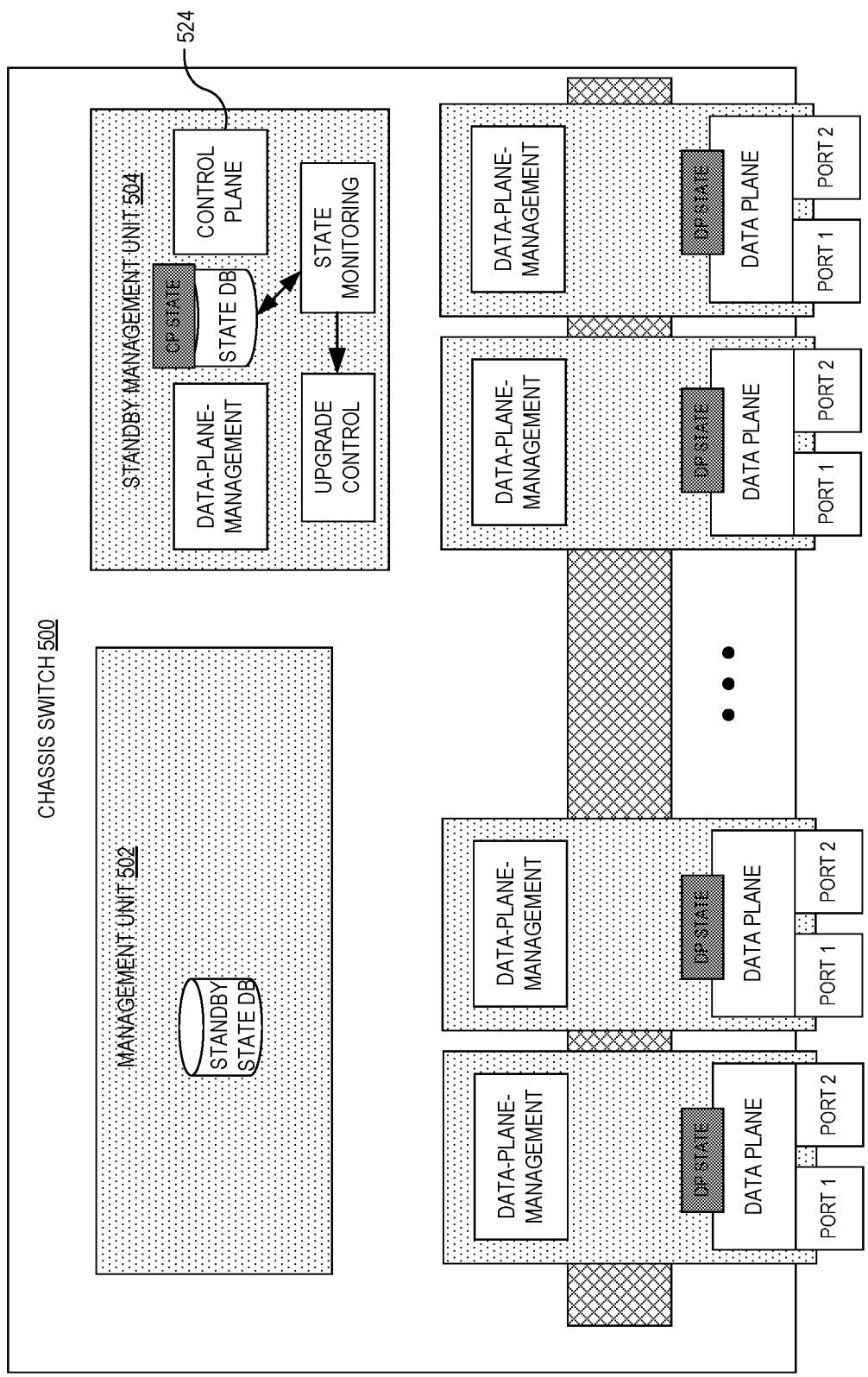
FIG. 5D illustrates the chassis switch with the upgraded control-plane function block, according to one aspect of the instant application.

Returning to FIG. 4, after the data-plane-management function block is upgraded, the device can upgrade the control-plane function block (operation 410). According to one aspect, upgrading the control-plane function block can also involve first terminating the currently running control-plane function block and then restarting an upgraded version of the control-plane function block. When the control-plane function block is being upgraded, the device temporarily loses its control plane. However, the downtime of the control plane is very brief (e.g., less than a few seconds) and can be comparable to the time needed to switch the management of the device from a current management unit to a standby management unit in response to a failure. FIG. 5D illustrates the chassis switch with the upgraded control-plane function block, according to one aspect of the instant application. The upgraded control-plane function block can start on the same management unit (e.g., the same processor), where the upgraded data-plane-management function block is executing. In the example shown in FIG. 5D, upgraded control-plane function block 524 also migrates to standby management unit 504. In fact, standby-management unit 504 is no longer operating in the standby mode, and the standby state database becomes the main state database with its stored data-plane and control-plane states being continuously updated by the upgraded data-plane-management function block and upgraded control-plane function block 524. On the other hand, the previously active management unit 502 is placed in the standby mode with its state database becoming the standby state database. FIG. 5D shows that, after the ISSU, the upgraded data-plane-management function block and control-plane function block both migrate to a different management unit, and the previous management unit is placed in a standby mode.

Returning again to FIG. 4, subsequent to upgrading the control-plane function block, the data-plane state and the control-plane state can be converged (operation 412), thus completing the ISSU process. Because during the ISSU process, the data-plane state in the ISSU state database is not updated (i.e., it is "frozen" to the state at the beginning of the upgrade) by the control-plane function block while the control-plane state continues to be updated by the control plane, the data-plane state and the control-plane state may diverge (e.g., the data-plane state may be inconsistent with the network state due to changes in the network during the upgrade process). For a stable network, a small amount of divergence can be manageable and the data-plane state and the control-plane state in the state database can be converged after the upgrade process. However, a large divergence between the data-plane state and the control-plane state could affect the stability of the network and should be avoided.

To avoid the instability of the network caused by the upgrade process, FIG. 4 also shows that when the ISSU is in process, the device actively monitors the dynamic state of the network (or services in the control plane) as well as the dynamic state of the device (or hardware state of the data plane) (operation 414). According to one aspect, such monitoring can be done by monitoring the states associated with the device (e.g., the data-plane state in the ISSU database and the control-plane state in the state database) during the upgrade process. To conserve resources, not all services are monitored. According to one aspect, only services meeting a set of predefined criteria are monitored. One of the criteria can be the service being "critical." A service can be critical based on its type, or its associated port, interface, overlays, or AAA events associated with the service. When an event associated with a critical service is detected, the device can determine if a triggering condition has been met (operation 416). Exemplary triggering conditions can include but are not limited to: the event may cause the upgrade to fail, the event may cause instability in the network, the detected event may cause an outage or error in the network, the event may cause failure or interruption of critical services, etc. In addition to external events (e.g., events in the network or on the device), certain internal events may also meet the triggering condition (e.g., a process crashes and cannot be restarted during the upgrade). If the triggering condition is met, a remedial action can be taken (operation 418). The remedial action can include but is not limited to: pausing the upgrade process, rolling back the upgrade process to a previous state, aborting the upgrade process, or rebooting the device being upgraded, etc.

Figure 6:
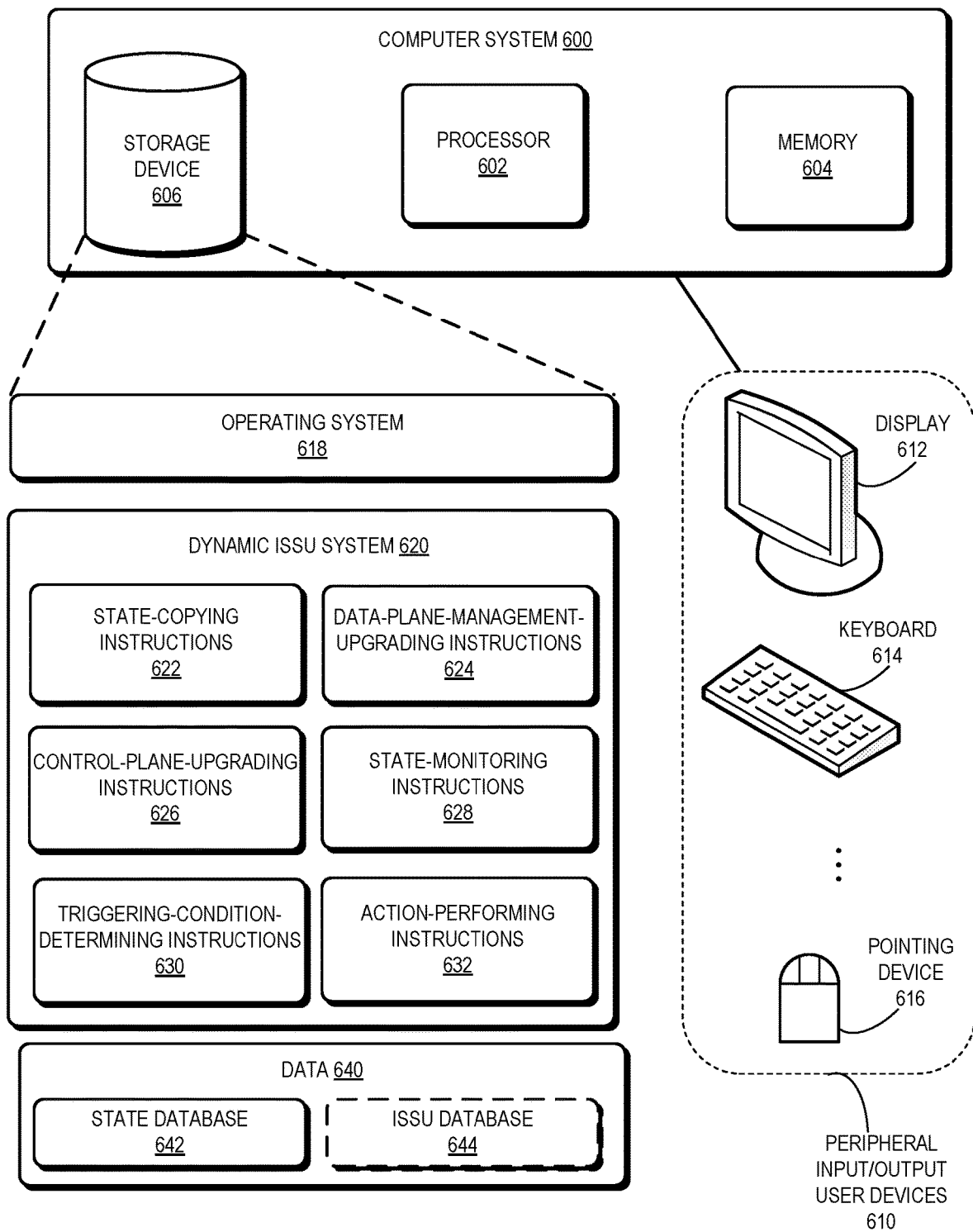
FIG. 6 illustrates a computer system that facilitates the dynamic ISSU process, according to one aspect of the application.

FIG. 6 illustrates a computer system that facilitates the dynamic ISSU process, according to one aspect of the application. Computer system 600 includes a processor 602, a memory 604, and a storage device 606. Furthermore, computer system 600 can be coupled to peripheral input/output (I/O) user devices 610, e.g., a display device 612, a keyboard 614, and a pointing device 616. Storage device 606 can store an operating system 618, a dynamic ISSU system 620, and data 640. According to one aspect, computer system 600 can be part of a network device (e.g., a switch or router).

Dynamic ISSU system 620 can include instructions, which when executed by computer system 600, can cause computer system 600 or processor 602 to perform methods and/or processes described in this disclosure. Specifically, dynamic ISSU system 620 can include instructions for generating a copy of the data-plane state (state-copying instructions 622), instructions for upgrading the data-plane-management function block (data-plane-management-upgrading instructions 624), instructions for upgrading the control-plane function block (control-plane-upgrading instructions 626), instructions for monitoring the data-plane and control-plane state to detect events on the network device and in the network (state-monitoring instructions 628), instructions for determining whether a detected event meets a triggering condition based on a set of pre-defined criteria (triggering-condition-determination instructions 630), and instructions for performing appropriate actions responsive to the detected event (action-performing instructions 632). Data 640 can include a state database 642 and a temporary ISSU database 644.

In general, this disclosure provides a system and method for providing a dynamic in-service software upgrade (ISSU) that can be flexibly implemented in a wide variety of network devices, including low-cost resource-constrained network devices. To enable the ISSU, the management/control software of a to-be-upgraded network device should have its control-plane software detached from the data-plane-management software. During normal operation of the network device, both the control-plane software and the data-plane-management software operate based on a centralized state database. When the ISSU process is initiated, a temporary ISSU database is generated to store at least a copy of the data-plane state. During the ISSU process, the data-plane-management software operates based on the ISSU database and the control-plane software operates based on the state database. This allows the data-plane-management software and the control-plane software to be upgraded separately, without interrupting services provided by the network device and without shutting down any control protocol. Moreover, during the ISSU process, the data-plane state in the ISSU database and the control-plane state in the state database are monitored to detect internal and external events that may affect the upgrade process or the stability of the network. In response to a detected event meeting a triggering condition, an appropriate action can be taken to prevent errors or outages in the network.

One aspect of the instant application provides a system and method for performing an in-service software upgrade on a network device. During operation, in response to a software-upgrade command, the system generates an upgrade database based on a state database storing both a data-plane state and a control-plane state associated with the network device. The network device is managed by a management unit comprising a data-plane-management sub-unit and a control-plane sub-unit, and the upgrade database stores at least the data-plane state to allow the data-plane-management sub-unit to operate based on the upgrade database. The system upgrades the management unit by separately upgrading the data-plane-management sub-unit and the control-plane sub-unit, without interrupting services provided by the network device. The system monitors the control-plane state in the state database and the data-plane state in the upgrade database to detect an event associated with the network device during the upgrading of the management unit. In response to determining, based on the detected event and a set of pre-defined criteria, that a triggering condition is met, the system performs an action to prevent a network outage or error.

In a variation on this aspect, generating the upgrade database comprises creating a clone of the state database or copying the data-plane state into the upgrade database.

In a variation on this aspect, upgrading the data-plane-management sub-unit comprises: terminating the data-plane-management sub-unit without affecting operations of the control-plane sub-unit, executing a newer version of the data-plane-management sub-unit, and reattaching the newer version of the data-plane-management sub-unit to data-plane hardware on the network device based on the data-plane state in the upgrade database.

In a further variation, the management unit executes on a first processor, and executing the newer version of the data-plane-management sub-unit comprises executing the newer version of the data-plane-management sub-unit on a second standby processor.

In a further variation, upgrading the control-plane sub-unit comprises: terminating the control-plane sub-unit, and executing a newer version of the control-plane sub-unit on the second standby processor.

In a variation on this aspect, the set of predefined criteria comprises one or more of: the detected event is associated with a critical service; the detected event is associated with a critical port; the detected event is associated with a critical interface; the detected event is associated with a critical overlay; the detected event is a pre-determined AAA (Authentication, Authorization, and Accounting) event; the detected event is associated with a predetermined network protocol; and the detected event is an internal failure of the management unit.

In a variation on this aspect, the triggering condition comprises one or more of: the detected event may cause the in-service software upgrade to fail; the detected event may cause instability in the network; the detected event may cause an outage or error in the network; and the detected event may interrupt a critical service.

In a variation on this aspect, the action comprises one or more of: pausing the upgrading of the management unit, rolling back the upgrading of the management unit to a previous state, aborting the upgrading of the management unit, and rebooting the network device.

In a variation on this aspect, upgrading the management unit further comprises converging the data-plane state in the upgrade database and the control-plane state in the state database.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A computer-executed method for performing an in-service software upgrade on a network device, the method comprising:
   in response to a software-upgrade command, generating an upgrade database based on a state database storing both a data-plane state and a control-plane state associated with the network device, wherein the network device is managed by a management unit comprising a data-plane-management sub-unit for configuring hardware devices according to the data-plane state and a control-plane sub-unit for monitoring the control-plane state, and wherein the upgrade database stores at least a copy of the data-plane state prior to the upgrade;
   upgrading the management unit by separately upgrading the data-plane-management sub-unit and the control-plane sub-unit, without interrupting services provided by the network device, wherein upgrading the data-plane-management sub-unit comprises:
      terminating the data-plane-management sub-unit to allow the hardware devices to operate in an autonomous mode;
      restarting a newer version of the data-plane-management sub-unit; and
      reattaching the newer version of the data-plane-management sub-unit to the hardware devices based on the copy of the data-plane state prior to the upgrade stored in the upgrade database;
   monitoring the control-plane state in the state database and the data-plane state in the upgrade database to detect an event associated with the network device during the upgrading of the management unit; and
   in response to determining, based on the detected event and a set of pre-defined criteria, that a triggering condition is met, performing an action to prevent a network outage or error.

2. The method of claim 1, wherein generating the upgrade database comprises creating a clone of the state database or copying the data-plane state into the upgrade database.

3. The method of claim 1, wherein the management unit executes on a first processor, and wherein restarting the newer version of the data-plane-management sub-unit comprises executing the newer version of the data-plane-management sub-unit on a second standby processor.

4. The method of claim 3, wherein upgrading the control-plane sub-unit comprises:
   terminating the control-plane sub-unit; and
   restarting a newer version of the control-plane sub-unit on the second standby processor.

5. The method of claim 1, wherein the set of predefined criteria comprises one or more of:
   the detected event is associated with a critical service;
   the detected event is associated with a critical port;
   the detected event is associated with a critical interface;
   the detected event is associated with a critical overlay;
   the detected event is a pre-determined AAA (Authentication, Authorization, and Accounting) event;
   the detected event is associated with a predetermined network protocol; and
   the detected event is an internal failure of the management unit.

6. The method of claim 1, wherein the triggering condition comprises one or more of:
   the detected event may cause the in-service software upgrade to fail;
   the detected event may cause instability in the network;
   the detected event may cause an outage or error in the network; and
   the detected event may interrupt a critical service.

7. The method of claim 1, wherein the action comprises one or more of:
   pausing the upgrading of the management unit;
   rolling back the upgrading of the management unit to a previous state;
   aborting the upgrading of the management unit; and
   rebooting the network device.

8. The method of claim 1, wherein upgrading the management unit further comprises converging the data-plane state in the upgrade database and the control-plane state in the state database.

9. A computer system, comprising:
   a processor; and
   a storage device coupled to the processor and storing instructions that when executed by the processor cause the processor to perform a method for facilitating an in-service software upgrade on a network device, the method comprising:
      in response to a software-upgrade command, generating an upgrade database based on a state database storing both a data-plane state and a control-plane state associated with the network device, wherein the network device is managed by a management unit comprising a data-plane-management sub-unit for configuring hardware devices according to the data-plane state and a control-plane sub-unit for monitoring the control-plane state, and wherein the upgrade database stores at least a copy of the data-plane state prior to the upgrade;
      upgrading the management unit by separately upgrading the data-plane-management sub-unit and the control-plane sub-unit, without interrupting services provided by the network device, wherein upgrading the data-plane-management sub-unit comprises:

terminating the data-plane-management sub-unit to allow the hardware devices to operate in an autonomous mode;
restarting a newer version of the data-plane-management sub-unit; and
reattaching the newer version of the data-plane-management sub-unit to the hardware devices based on the copy of the data-plane state prior to the upgrade stored in the upgrade database;
monitoring the control-plane state in the state database and the data-plane state in the upgrade database to detect an event associated with the network device during the upgrading of the management unit; and
in response to determining, based on the detected event and a set of pre-defined criteria, that a triggering condition is met, performing an action to prevent a network outage or error.

10. The computer system of claim 9, wherein generating the upgrade database comprises creating a clone of the state database or copying the data-plane state into the upgrade database.

11. The computer system of claim 9, wherein the management unit executes on a first processor, and wherein executing restarting the newer version of the data-plane-management sub-unit comprises executing the newer version of the data-plane-management sub-unit on a second standby processor.

12. The computer system of claim 11, wherein upgrading the control-plane sub-unit comprises:
terminating the control-plane sub-unit; and
restarting a newer version of the control-plane sub-unit on the second standby processor.

13. The computer system of claim 9, wherein the set of predefined criteria comprises one or more of:
the detected event is associated with a critical service;
the detected event is associated with a critical port;
the detected event is associated with a critical interface;
the detected event is associated with a critical overlay;
the detected event is a pre-determined AAA (Authentication, Authorization, and Accounting) event;
the detected event is associated with a predetermined network protocol; and
the detected event is an internal failure of the management unit.

14. The computer system of claim 9, wherein the triggering condition comprises one or more of:
the detected event may cause the in-service software upgrade to fail;
the detected event may cause instability in the network;
the detected event may cause an outage or error in the network; and
the detected event may interrupt a critical service.

15. The computer system of claim 9, wherein the action comprises one or more of:
pausing the upgrading of the management unit;
rolling back the upgrading of the management unit to a previous state;
aborting the upgrading of the management unit; and
rebooting the network device.

16. The computer system of claim 9, wherein upgrading the management unit further comprises converging the data-plane state in the upgrade database and the control-plane state in the state database.

17. A non-transitory computer-readable storage medium storing instructions that when executed by a computer cause the computer to perform a method for facilitating an in-service software upgrade on a network device, the method comprising:
in response to a software-upgrade command, generating an upgrade database based on a state database storing both a data-plane state and a control-plane state associated with the network device, wherein the network device is managed by a management unit comprising a data-plane-management sub-unit for configuring hardware devices according to the data-plane state and a control-plane sub-unit for monitoring the control-plane state, and wherein the upgrade database stores at least a copy of the data-plane state prior to the upgrade;
upgrading the management unit by separately upgrading the data-plane-management sub-unit and the control-plane sub-unit, without interrupting services provided by the network device, wherein upgrading the data-plane-management sub-unit comprises:
terminating the data-plane-management sub-unit to allow the hardware devices to operate in an autonomous mode;
restarting a newer version of the data-plane-management sub-unit; and
reattaching the newer version of the data-plane-management sub-unit to the hardware devices based on the copy of the data-plane state prior to the upgrade stored in the upgrade database;
monitoring the control-plane state in the state database and the data-plane state in the upgrade database to detect an event associated with the network device during the upgrading of the management unit; and
in response to determining, based on the detected event and a set of pre-defined criteria, that a triggering condition is met, performing an action to prevent a network outage or error.

18. The non-transitory computer-readable storage medium of claim 17, wherein the set of predefined criteria comprises:
the detected event is associated with a critical service;
the detected event is associated with a critical port;
the detected event is associated with a critical interface;
the detected event is associated with a critical overlay;
the detected event is a pre-determined AAA (Authentication, Authorization, and Accounting) event;
the detected event is associated with a predetermined network protocol; and
the detected event is an internal failure of the management unit.

* * * * *